(12) United States Patent
Hirose et al.

(10) Patent No.: US 8,519,046 B2
(45) Date of Patent: Aug. 27, 2013

(54) POLYOLEFIN RESIN DISPERSION COMPOSITION AND PROCESS FOR PRODUCING THE SAME

(75) Inventors: Takayuki Hirose, Yamaguchi (JP); Naosuke Komoto, Yamaguchi (JP); Kensho Okayama, Yamaguchi (JP); Koji Masumoto, Yamaguchi (JP); Naoko Nagaoka, Yamaguchi (JP)

(73) Assignee: Nippon Paper Chemicals Co., Ltd., Tokyo (JP)

( * ) Notice: Subject to any disclaimer, the term of this patent is extended or adjusted under 35 U.S.C. 154(b) by 543 days.

(21) Appl. No.: 12/519,169

(22) PCT Filed: Dec. 13, 2007

(86) PCT No.: PCT/JP2007/074017
§ 371 (c)(1),
(2), (4) Date: Jun. 15, 2009

(87) PCT Pub. No.: WO2008/072689
PCT Pub. Date: Jun. 19, 2008

(65) Prior Publication Data
US 2010/0029836 A1 Feb. 4, 2010

(30) Foreign Application Priority Data
Dec. 13, 2006 (JP) .................. 2006-336057

(51) Int. Cl.
*C08K 5/00* (2006.01)
*B05D 7/00* (2006.01)
*C08J 3/00* (2006.01)
*C08L 33/00* (2006.01)
*C04B 24/26* (2006.01)

(52) U.S. Cl.
USPC ............................ 524/522; 524/515; 524/523

(58) Field of Classification Search
USPC ........................................ 524/522, 515, 523
See application file for complete search history.

(56) References Cited

U.S. PATENT DOCUMENTS

2005/0143527 A1* 6/2005 Tsuneka et al. ............ 525/326.1
2007/0010630 A1* 1/2007 Aburatani et al. ......... 525/333.7

FOREIGN PATENT DOCUMENTS

| JP | 6 509383 | 10/1994 |
| JP | 2004 18659 | 1/2004 |
| JP | 2005 126482 | 5/2005 |
| JP | 2007 177148 | 7/2007 |
| WO | WO 9303104 A1 * | 2/1993 |

* cited by examiner

*Primary Examiner* — Angela C Scott
(74) *Attorney, Agent, or Firm* — Oblon, Spivak, McClelland, Maier & Neustadt, L.L.P.

(57) ABSTRACT

It is an object of the present invention to provide a polyolefin resin dispersion composition in which the dispersed resin is stable to water or a hydrophilic substance, and which has an adhesive property to nonpolar substrates, in particular poorly adhesive polyolefin-based substrates whose surface has not been treated, is excellent in a coating property, exhibits an excellent adhesive property through drying and press bonding with heat at a temperature in a wide range regardless of whether the temperature is low or high, is excellent in water resistance and gasohol resistance and is less tacky. That is, the present invention provides the dispersed resin composition containing (a) a polyolefin resin, (b) a (meth)acrylic acid homopolymer or copolymer having a side chain comprising an esterified alkyl group, (c) a basic substance and (d) water or a hydrophilic substance, and a process for producing the same.

14 Claims, No Drawings

POLYOLEFIN RESIN DISPERSION COMPOSITION AND PROCESS FOR PRODUCING THE SAME

TECHNICAL FIELD

The present invention relates to a polyolefin resin dispersion composition which is excellent in dispersibility in water or hydrophilic substances as well as is excellent in adhesive property to nonpolar substrates, in particular, poorly adhesive polyolefin-based substrates whose surface are not treated regardless of a temperature condition upon baking, and which has water resistance and gasohol resistance and is less tacky; and the present invention relates to a process for producing the composition.

BACKGROUND ART

Conventionally, chlorinated polyolefin resins and propylene-based random copolymers modified by using acids such as unsaturated carboxylic acid and anhydride thereof, which have an excellent adhesive property, have been used as binders for poorly adhesive polyolefin substrates such as polypropylene and polyethylene. Also in an automobile industry, the above chlorinated polyolefin resins and the above propylene-based random copolymers modified by using the acids such as unsaturated carboxylic acid and anhydride thereof have been used as the binders (particularly referred to as a primer in the automobile industry) for allowing a poorly adhesive paint to adhere to the polyolefin substrate.

In recent years, a drying (baking) temperature in a paint line of automobile parts has tended to be lowered mainly for the purpose of cost saving and preventing deformation of substrates. Furthermore, solvent-based paints are being replaced to water-based paints in terms of environmental problems. Thus, the chlorinated polyolefin resin and the propylene-based random copolymer modified by using acids such as the unsaturated carboxylic acid and the anhydride thereof are required to turned them into water-based.

To improve this, it has been actively attempted to make polyolefin resins water-based. However, conventional aqueous resin composition of such polyolefin resin has a problem in that a surfactant added upon production is left in films and coating films obtained from the composition, which has reduced water resistance of the film and the coating film.

As a method for improving them, Patent Document 1 (JP 2004-18659 A) discloses that acid-modified chlorinated polyolefin can be dispersed in water by using an ether-based solvent without using an emulsifier. However, after removing the ether-based solvent, stability of the resin dispersed in the water is insufficient.

Thus, a dispersed resin composition having an adhesive property to polyolefin-based substrates, being excellent in stability in water or hydrophilic substances, having water resistance upon being dispersed in water, and being excellent in adhesive property regardless of a temperature condition upon baking, has been required.
Patent Document 1:JP 2004-18659 A

DISCLOSURE OF INVENTION

Problem to be Solved by the Invention

It is an object of the present invention to enhance a dispersibility of a polyolefin resin or a modified polyolefin resin in water or hydrophilic substances. Furthermore, it is also an object of the present invention to provide a polyolefin resin dispersion composition which has an adhesive property to nonpolar substrates, in particular, poorly adhesive polyolefin-based substrates whose surface are not treated, is excellent in coating property, exhibits the excellent adhesive property through drying and pressure bonding with heating under temperature in a wide range regardless of whether the temperature is low or high, is excellent in water resistance and gasohol resistance, and is less tacky.

Means for Solving Problem

As a result of an extensive study in the light of the above problems, the present inventors have found that a dispersibility of a polyolefin resin in water or hydrophilic substances can be enhanced by adding a particular ester group-containing (meth)acrylic acid homopolymer or copolymer on the step of dispersing the polyolefin resin in the water or the hydrophilic substances, and completed the present invention.

The present invention includes:
(1) A dispersed resin composition comprising the following components (a) to (d):
   (a) a polyolefin resin;
   (b) a (meth)acrylic acid homopolymer or copolymer having a side chain containing an esterified alkyl group;
   (c) a basic substance; and
   (d) water or a hydrophilic substance.
(2) The dispersed resin composition according to (1), wherein said (b) (meth)acrylic acid homopolymer or copolymer is an ester group-containing (meth)acrylic acid homopolymer or copolymer obtained by bulk polymerizing (i) (meth)acrylic acid, or (i) (meth)acrylic acid and (ii) a monomer having an unsaturated bond copolymerizable with said (meth)acrylic acid, simultaneously with esterifying in alcohol having 3 or more carbon atoms and a straight or branched structure.
(3) The dispersed resin composition according to (1) or (2), wherein an acid value of said (b) (meth)acrylic acid homopolymer or copolymer is within a range of 1 to 300 mg KOH/g.
(4) The dispersed resin composition according to any one of (1) to (3), wherein said polyolefin resin is a modified polyolefin resin using one or more polarity-imparting agents selected from chlorine, unsaturated carboxylic acids, derivatives and anhydrides of unsaturated carboxylic acids, and radical polymerizable monomers.
(5) A process for producing a dispersed resin composition comprising: dissolving (a) a polyolefin resin and (b) a (meth) acrylic acid homopolymer or copolymer having a side chain containing an esterified alkyl group in a solvent, subsequently adding (c) a basic substance to neutralize, subsequently adding (d) water or a hydrophilic substance to disperse, and then removing the solvent.
(6) A process for producing a dispersed resin composition comprising: adding (a) a polyolefin resin, (b) a (meth)acrylic acid homopolymer or copolymer having a side chain containing an esterified alkyl group, (c) a basic substance and (d) water or a hydrophilic substance together in a reaction system, and stirring them.

Effect of the Invention

The dispersed resin composition of the present invention has good dispersibility in water or hydrophilic substances regardless of an amount of a blended surfactant and is excellent in storage stability. Furthermore, the polyolefin resin dispersion composition of the present invention has an excellent adhesive property to nonpolar substrates such as polyolefin regardless of a temperature condition upon baking and is excellent in water resistance and gasohol resistance. Also the polyolefin resin dispersion composition of the present invention can exert a performance which the polyolefin resin has without reducing its performance when the polyolefin resin is dried to form a film or a coating film, and is suitable for uses for primers, inks, adhesive agents and paints for hair grafts.

BEST MODES FOR CARRYING OUT THE INVENTION

The present invention will be described in detail below.

The dispersed resin composition of the present invention is characterized by comprising (a) a polyolefin resin, (b) a (meth)acrylic acid homopolymer or copolymer having a side chain containing an esterified alkyl group, (c) a basic substance and (d) water or a hydrophilic substance. The dispersed resin composition of the present invention exhibits a stable dispersion state and has good physical properties by containing these components.

In the present invention, (a) a polyolefin resin is used as the first component of the dispersed resin composition. The examples of the (a) polyolefin resin may include those obtained by copolymerizing ethylene or $\alpha$-olefin using Ziegler-Natta catalyst or a metallocene catalyst as a polymerization catalyst. Specifically, the resin selected from polypropylene, ethylene-propylene copolymers, propylene-butene copolymers and ethylene-propylene-butene copolymers (hereinafter, these copolymers may be collectively referred to as propylene-based random copolymers) may be exemplified. These resins may be used alone or in mixture of two or more.

An example of the (a) polyolefin resin of the present invention may be the polyolefin resin having a melting point (Tm) of 60 to 165° C. measured using a differential scanning calorimeter (DSC). When the melting point is lower than 60° C., the solvent resistance of the dispersed resin composition is potentially reduced, and when it exceeds 165° C., an adhesive property to substrates is potentially reduced.

By using the specific example listed above as the (a) polyolefin resin, it is possible to obtain the dispersed resin composition that is excellent in dispersibility in water or hydrophilic substances, and when a baking property to the polyolefin substrate is enhanced, it is possible to select the polyolefin resin depending on a baking temperature. Also, the polyolefin resin may be selected depending on usage such as primers for automobile painting, adhesive agents for heat sealing and adhesive agents for the inks.

For example, when a dispersion resin for baking at high temperature (common baking temperature: 100 to 120° C.) for an automobile primer is desired, a polyolefin resin produced using Ziegler-Natta catalyst or a metallocene catalyst is preferable. When a dispersion resin for baking at low temperature (common baking temperature: 60 to 100° C.) is desired, a polyolefin resin produced using a metallocene catalyst is preferable. In general, when resins having a lower melting point is used, a baking property at low temperature is more excellent. In particular, a propylene-based random copolymer produced by using a metallocene catalyst is excellent in a baking property at low temperature.

As the aforementioned metallocene catalysts, publicly known catalysts may be used. Specifically, a catalyst obtained by combining components (1) and (2), and if necessary a component (3) as described below is desirable.

Component (1): a metallocene complex that is a transition metal compound in 4 to 6 groups in the periodic table, having at least one conjugated 5-membered ring ligand.

Component (2): an ion-exchangeable lamellar silicate salt.

Component (3): an organic aluminium compound.

Measurement of Tm by DSC in the present invention can be performed, for example, under the following condition. Using a DSC measurement apparatus (supplied from Seiko Instruments Inc.), about 10 mg of a sample is melted at 200° C. for 5 minutes, subsequently crystallized by lowering to −60° C. at a rate of 10° C./minute, further melted by elevating to 200° C. at 10° C./minute, and a melting peak temperature is measured at that time. This temperature is evaluated as Tm. Tm in Examples described later was measured under the condition described above.

While a component composition of the (a) polyolefin resin used in the present invention is not particularly limited, the component composition of the (a) polyolefin resin used in the present invention preferably includes 60 mol % or more propylene component, more preferably includes 70 mol % or more, and particularly preferably includes 80 mol % or more. When the resin containing the propylene component at less than 60 mol % is used, the adhesive property to the propylene substrate is potentially reduced.

The weight average molecular weight of the (a) polyolefin resin is preferably 10,000 to 500,000, more preferably 20,000 to 300,000 and particularly preferably 65,000 to 200,000. The weight average molecular weights in the present invention including Examples are values by measuring according to gel permeation chromatography (standard substance: polystyrene). Also in the case of the modified polyolefin resin that is one example of the (a) polyolefin resin, described below, it is preferable from the same reason as the above that its weight average molecular weight is within the above range.

In the present invention, a modified polyolefin may be used as the (a) polyolefin resin. The modified polyolefin resin means one obtained by modifying the polyolefin resin described above. The condition for modification is not particularly limited, but it is preferable to modify using a polarity-imparting agent. By the use of the polarity-imparting agent, the physical properties such as the adhesive property and the gasohol resistance can be enhanced.

As the polarity-imparting agent, chlorine, unsaturated carboxylic acids, derivatives and anhydrides of unsaturated carboxylic acids and radical polymerizable monomers are available, and it is preferable to use one or more selected from these exemplifications. Two kinds or all three kinds of the polarity-imparting agents may be combined and used.

In the following description, resins obtained by modifying polyolefin resins using chlorine as polarity-imparting agents are referred to as chlorinated modified polyolefin resins, and resins obtained by modifying without using chlorine as polarity-imparting agents are referred to as non-chlorinated modified polyolefin resins. Regardless of whether chlorine is used or not as a polarity-imparting agents, polyolefin resins modified with the polarity-imparting agents are generally referred to as modified polyolefin resins.

While an amount of chlorine contained in the chlorinated modified polyolefin resin is not particularly limited, it is preferably 2 to 35% by weight, and particularly preferably 4 to 25% by weight. When the amount of chlorine is less than 2% by weight, the adhesive property to various nonpolar substrates is improved, but a solubility in an organic solvent is potentially reduced. When it exceeds 35% by weight, the adhesive property to various nonpolar substrates is potentially reduced.

A content rate of chlorine can be measured in accordance with JIS-K7229. That is, the content rate of chlorine can be measured using the "oxygen flask burning method" in which a chlorine-containing resin is burned under an oxygen atmosphere, a generated chlorine gas is absorbed with water and absorbed chlorine is quantified by titration.

Unsaturated carboxylic acid in the present invention means an unsaturated compound containing a carboxyl group, the derivative of unsaturated carboxylic acid means mono- or di-ester, amide and imide of this compound, and the anhydride of unsaturated carboxylic acid means the anhydride of this compound. Examples of unsaturated carboxylic acids, the derivatives and anhydrides of unsaturated carboxylic acids may include fumaric acid, maleic acid, itaconic acid, citraconic acid, aconitic acid, nadic acid, and their anhydrides, methyl fumarate, ethyl fumarate, propyl fumarate, butyl fumarate, dimethyl fumarate, diethyl fumarate, dipropyl fumarate, dibutyl fumarate, methyl maleate, ethyl maleate, propyl maleate, butyl maleate, dimethyl maleate, diethyl maleate, dipropyl maleate, dibutyl maleate, maleimide and N-phenylmaleimide, and are preferably itaconic anhydride and maleic anhydride. Unsaturated carboxylic acids, the derivatives and anhydrides of unsaturated carboxylic acids may be used alone or in mixture of two or more.

When only the compound selected from unsaturated carboxylic acids, the derivatives and anhydrides of unsaturated carboxylic acids is used as the polarity-imparting agent, if a graft weight is smaller than the above preferable range, the polarity of an adhesive agent composition is reduced, thus reducing its solubility in the organic solvent. Conversely if the graft weight is too large, unreacted compounds are left abundantly, and the adhesive property to a nonpolar adherend is reduced; thus, it is not preferable.

The graft weight (%) of unsaturated carboxylic acid, the derivative and anhydride of unsaturated carboxylic acid can be obtained by an alkali titration method or a Fourier transform infrared spectroscopy. Numerical values shown in Examples described later are the values by measuring according to this method.

A radical polymerizable monomer in the present invention means a (meth)acryl compound and a vinyl compound. The (meth)acryl compound is a compound containing at least one (meth)acryloyl group (which means an acryloyl group and/or a methacryloyl group) in a molecule. The examples of the radical polymerizable monomers may include (meth)acrylic acid, methyl(meth)acrylate, ethyl(meth)acrylate, n-butyl (meth)acrylate, cyclohexyl(meth)acrylate, isobornyl(meth) acrylate, glycidyl(meth)acrylate, octyl(meth)acrylate, lauryl (meth)acrylate, tridecyl(meth)acrylate, stearyl(meth) acrylate, benzyl(meth)acrylate, phenyl(meth)acrylate, dimethylaminoethyl(meth)acrylate, diethylaminoethyl (meth)acrylate, hydroxyethyl(meth)acrylate, 2-hydroxyethyl (meth)acrylate, N,N-dimethylaminoethyl(meth)acrylate, acetoacetoxyethyl(meth)acrylate, N-methyl(meth)acrylamide, N-ethyl(meth)acrylamide, N-propyl(meth)acrylamide, N-isopropyl(meth)acrylamide, N-butyl(meth)acrylamide, N-isobutyl(meth)acrylamide, N-t-butyl(meth)acrylamide, N,N-dimethyl(meth)acrylamide, N,N-dimethylaminopropyl (meth)acrylamide, N,N-methylene-bis(meth)acrylamide, N-methylol(meth)acrylamide, hydroxyethyl(meth)acrylamide, (meth)acryloyl morpholine, n-butylvinyl ether, 4-hydroxybutylvinyl ether and dodecylvinyl ether. In particular, methyl(meth)acrylate, ethyl(meth)acrylate, cyclohexyl (meth)acrylate, and lauryl(meth)acrylate are preferable, and among them, methacrylate is preferable. These may be used alone or in mixture of two or more, and a mixed ratio thereof may be freely designed.

As the (meth)acryl compound, those containing at least one or more compounds selected from (meth)acrylate ester represented by the following general formula (I) in an amount of 20% by weight or more are also preferable. When this (meth) acryl compound is used, the molecular weight distribution of the modified polyolefin resin can be narrowed, and the solubility of the modified polyolefin resin in a solvent and its compatibility with the other resin can be further enhanced.

$$CH_2=CR_1COOR_2 \qquad (I),$$

wherein $R_1$ is H or $CH_3$, and $R_2$ is $C_nH_{2n+1}$, n is an integer of 1 to 18, and n in the above general formula (I) is preferably the integer of 8 to 18.

The graft weight of the radical polymerizable monomer in the modified polyolefin resin is preferably 0.1 to 30% by weight and particularly preferably 0.5 to 20% by weight. When only the radical polymerizable monomer is used as the polarity-imparting agent, if the graft weight is smaller than 0.1% by weight, the solubility of the modified polyolefin resin, its compatibility with the other resin and its adhesive force are reduced. When the graft weight is larger than 30% by weight, due to high reactivity, an ultrahigh molecular weight body is formed to deteriorate the solubility in the solvent, and the amounts of generated homopolymer and copolymer that are not grafted to a polyolefin skeleton are increased; thus, it is not preferable.

The graft weight of the radical polymerizable monomer can be obtained by the Fourier transform infrared spectroscopy or $^1$H-NMR. Numerical values shown in Examples described later are the values by measuring according to this method.

In the present invention, when chlorine is used as the polarity-imparting agent, the total content of the polarity-imparting agents to be used is 0.1 to 45% by weight, preferably 1 to 30% by weight and more preferably 3 to 25% by weight. When the content is less than 0.1% by weight, the solubility of the modified polyolefin resin and its compatibility with other resins are potentially reduced. When it is more than 45% by weight, its adhesive property is potentially reduced.

When chlorine is not used as the polarity-imparting agent, the total graft weight of the polarity-imparting agents to be used is 0.1 to 30% by weight, preferably 0.1 to 20% by weight and more preferably 0.1 to 10% by weight. When the amount is less than 0.1% by weight, the solubility of the modified polyolefin resin and its compatibility with the other resin are potentially reduced. When it is more than 30% by weight, the adhesive property is potentially reduced.

The total amount of the polarity-imparting agents in the modified polyolefin resin means the total amount of the graft weights (%) of chlorine and the other polarity-imparting agents when chlorine is used as the polarity-imparting agent. When chlorine is not used, it means the total amount of the respective polarity-imparting agents.

Here, a chlorinated modified polyolefin resin obtained when chlorine is used as the polarity-imparting agent is deteriorated with dehydrochlorination when exposed to ultraviolet ray and high heat. When the chlorinated modified polyolefin resin is deteriorated with the dehydrochlorination, physical properties are potentially reduced: for example, the resin is potentially colored; in addition its adhesive property to substrates such as polypropylene substrates is potentially reduced; and deterioration of a working environment is potentially caused by liberated hydrochloric acid. Thus, it is desirable to add a stabilizer. The amount of the stabilizer to be added is preferably 0.1 to 5% by weight relative to resin components (solid contents) for obtaining the above effects. Epoxy compounds may be exemplified as the stabilizer, and among them, the compound that is compatible with the chlorinated modified polyolefin resin is preferable. As preferable examples, those having an epoxy equivalent of about 100 to 500 and one or more epoxy groups in a molecule may be exemplified.

As specific examples of such epoxy compounds may include: epoxidized soybean oil and epoxidized linseed oil obtained by epoxidizing vegetable oils having natural unsaturated groups with peracid such as peracetic acid; epoxidized fatty acid esters obtained by epoxidizing unsaturated fatty acids such as oleic acid, tall oil fatty acid and soybean oil fatty acid; epoxidized alicyclic compounds typified by epoxidized tetrahydrophthalate; compounds obtained by condensing bisphenol A or polyvalent alcohol with epichlorohydrin, such as bisphenol A glycidyl ether, ethylene glycol glycidyl ether, propylene glycol glycidyl ether, glycerol polyglycidyl ether and sorbitol polyglycidyl ether. Monoepoxy compounds typified by butylglycidyl ether, 2-ethylhexylglycidyl ether, decylglycidyl ether, stearylglycidyl ether, allylglycidyl ether, phenylglycidyl ether, sec-butylphenylglycidyl ether, tert-butylphenylglycidyl ether and phenol polyethylene oxide glycidyl ether are also exemplified. Furthermore, metal soaps such as calcium stearate and lead stearate, organic metal compounds such as dibutyltin dilaurate and dibutyl maleate, and hydrotalcite compounds, which are used as stabilizers for polyvinyl chloride resins, may be used. These epoxy compounds may be used alone or in combination of two or more.

In the present invention, among the aforementioned polarity-imparting agents, it is the most preferable to use the followings. When modified polyolefin obtained using the following polarity-imparting agents, the dispersed resin composition that is excellent in emulsification performance can be obtained.

One or two or more selected from unsaturated carboxylic acids, derivatives and anhydrides of the unsaturated carboxylic acids Combination of chlorine with one or two or more selected from unsaturated carboxylic acids, derivatives and anhydrides of the unsaturated carboxylic acids Combination of the radical polymerizable monomer with one or two or more selected from unsaturated carboxylic acids, the derivatives and anhydrides of unsaturated carboxylic acids Processes for obtaining the modified polyolefin resin by modifying the polyolefin resin using the polarity-imparting agent are not particularly limited. Here, the polyolefin resin to be used may be appropriately selected from those exemplified and listed as the (a) polyolefin resin and used. In order to obtain the modified polyolefin resin by graft-polymerizing the polarity-imparting agent onto the polyolefin resin, it is possible to apply publicly known methods. The examples of the process for obtaining the modified polyolefin resin may include: a solution method in which a mixture of the polyolefin resin and the polarity-imparting agent is dissolved with heating in the solvent such as toluene and then a radical generator is added thereto; and a melting kneading method in which the polyolefin resin, the polarity-imparting agent, an ethylene α-olefin copolymer and the radical generator are added and kneaded using a Banbury mixer, a kneader or an extruder. When one or more compounds selected from unsaturated carboxylic acids, the derivatives and anhydrides of unsaturated carboxylic acids and the radical polymerizable monomers are used as the polarity-imparting agent, these may be added together or may be added sequentially.

An order upon graft-polymerizing the polarity-imparting agent onto the polyolefin resin is not particularly limited.

The radical generator to be used in a reaction for graft-polymerizing the polarity-imparting agent onto the polyolefin resin may be appropriately selected from the publicly known compounds. In particular, organic peroxide-based compounds are preferable. Examples thereof may include di-t-butyl peroxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)-cyclohexane, cyclohexanone peroxide, t-butyl peroxybenzoate, t-butyl peroxyisobutyrate, t-butylperoxy-3,5,5-trimethyl hexanoate, t-butylperoxy-2-ethyl hexanoate, t-butylperoxyisopropyl carbonate and cumylperoxy octoate. Among them, dicumyl peroxide, di-t-butyl peroxide and dilauryl peroxide are preferable. The amount of the radical generator to be added in the polyolefin resin is preferably 1 to 50% by weight and particularly preferably 3 to 30% by weight based on the amount of the polarity-imparting agent. When the amount is less than this range, a graft rate is potentially reduced. When the amount exceeds this range, it is not economical.

When the compound selected from unsaturated carboxylic acids, the derivatives and anhydrides of unsaturated carboxylic acids, and the radical polymerizable monomers is used as the polarity-imparting agent, styrene, o-, p-, α-methylstyrene, divinylbenzene, hexadiene and dicyclopentadiene may be added as a reaction aid.

When chlorine is used with one or more compounds selected from the unsaturated carboxylic acids as the polarity-imparting agents, the derivatives and anhydrides of unsaturated carboxylic acids and the radical polymerizable monomers, it is preferable to perform a step of chlorination at the last. That is, it is preferable that one or more compounds selected from the unsaturated carboxylic acids, the derivatives and anhydrides of the unsaturated carboxylic acids and the radical polymerizable monomers are graft-polymerized onto the polyolefin resin according to the aforementioned solution method or melting kneading method, followed by chlorination according to the method described later. When the step of chlorination is performed before graft-polymerizing one or more compounds selected from unsaturated carboxylic acids, the derivatives and anhydrides of unsaturated carboxylic acids and the radical polymerizable monomers, the graft polymerization might cause the dehydrochlorination. Thus, it is not preferable, but when this is necessary, the graft polymerization may be performed by the solution method at low temperature.

When a compound containing ester such as (meth)acrylate ester is used as the radical polymerizable monomer, it is preferable to graft-polymerize those compounds after the step of chlorination because ester might be degraded by the chlorination.

A preferable method for the chlorination to obtain the chlorinated modified polyolefin resin, for example, is that the modified polyolefin resin subjected to graft-polymerization with the polarity-imparting agent is dissolved in a solvent such as chloroform, and then gaseous chlorine is blew with being irradiated with the ultraviolet ray or in the presence of the radical generator. An introduction rate of chlorine varies depending on the kind of the polyolefin resin or the differences of reaction elements such as a reaction scale and a reaction apparatus. Thus, the content of chlorine can be controlled with monitoring the amount and a time period of blowing chlorine.

The dispersed resin composition contains (b) a (meth) acrylic acid homopolymer or copolymer as the second component. At least, the (b) (meth)acrylic acid homopolymer or copolymer is required to have a side chain containing the esterified alkyl group, as the side chain. In the present invention, "(meth)acrylic acid" means both methacrylic acid and acrylic acid.

The (meth)acrylic acid homopolymer means the polymer composed of (meth)acrylic acid; that is, acrylic acid and/or methacrylic acid. Meanwhile, the (meth)acrylic acid copolymer means the copolymer of (meth)acrylic acid with one or two or more other monomers. As the other monomers, monomers having an unsaturated bond copolymerizable with (meth)acrylic acid are preferable, and for example, styrene, α-methylstyrene, vinyl toluene, t-butylstyrene and vinyl pyridine are available.

The alkyl group that composes the side chain has preferably 3 or more, more preferably 5 or more and particularly preferably 8 or more carbon atoms. The number of the carbon atoms in the alkyl groups that compose the respective side chains may be constant or different by each side chain. The alkyl group has an esterified structure in the side chain. Specifically, an alkyl ester group is preferable. In other words, it is preferable to be the side chain composed of the following general formula (A):

R—O—C(O)—    (A), wherein R represents alkyl, preferably alkyl having 3 or more carbon atoms. The upper limit of the alkyl group R is normally 25 or less, preferably 20 or less and more preferably 18 or less.

As the component (b), the (meth)acrylic acid homopolymer or copolymer having the side chain containing the esterified alkyl group described above may be used alone or in combination of two or more kinds.

The acid value of the (meth)acrylic acid homopolymer or copolymer used as the component (b) is preferably 1 to 300 mg KOH/g, more preferably 50 to 250 mg KOH/g and particularly preferably 100 to 200 mg KOH/g. When the acid value is low, the water resistance of the resin composition is enhanced, but the dispersibility tends to become poor. When the acid value is lower than 1 mg KOH/g, an emulsifying property is potentially deteriorated. When the acid value becomes high, the dispersibility of the resin composition is enhanced, but the water resistance tends to be reduced. When the acid value is higher than 300 mg KOH/g, the water resistance is deteriorated. When two or more (meth)acrylic acid homopolymers or copolymers are used as the (b) component, it is preferable that the acid value of each polymer satisfies the above range.

The acid value in the present invention including Examples can be determined by the titration with an assessed base, and is defined as a value (milligram) of potassium hydroxide required for neutralizing 1 g of the polymer.

The method for producing the (b) (meth)acrylic acid homopolymer or copolymer is not particularly limited. For example, the (meth)acrylic acid homopolymer may be obtained by bulk polymerizing (i) (meth)acrylic acid simultaneously with esterifying in alcohol. Likewise in the case of the (meth)acrylic acid copolymer, it is obtained by bulk polymerizing (i) (meth)acrylic acid and (ii) a monomer that has an unsaturated bond copolymerizable with (meth)acrylic acid, such as styrene, simultaneously with esterifying in alcohol. In the above production examples, alcohol may be controlled to become the structure in which the (meth)acrylic acid homopolymer or copolymer that is a final product has the desired side chain, and alcohol having 3 or more (preferably 3 to 25) carbon atoms and a straight or branched structure is used preferably. Conditions for the bulk polymerization may be appropriately selected from the conditions in which the esterification occurs. Taking the case of the (meth)acrylic acid copolymer as an example, a polymerization initiator such as di-t-butyl peroxide is added if necessary to alcohol, and (i) (meth)acrylic acid and (ii) the monomer having the unsaturated bond copolymerizable with (meth)acrylic acid can be polymerized under the condition at 150° C. or more for about 1 minute to 60 minutes.

The dispersed resin composition of the present invention contains (c) a basic substance as the third component. By containing the (c) basic substance, acid components in the (a) polyolefin resin and the (b) acryl resin can be neutralized to enhance the dispersibility in water or hydrophilic substances. Sodium hydroxide, potassium hydroxide, ammonia, methylamine, propylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol, morpholine and dimethylethanolamine are preferably exemplified. More preferably, ammonia, triethylamine, 2-amino-2-methyl-1-propanol, morpholine and dimethylethanolamine are exemplified. These may be used alone or in combination of two or more kinds. The amount of the (c) basic substance to be used may be controlled depending on the amount of the acid components in the modified polyolefin resin. In general, it is preferable that the amount of the basic substance is controlled so that pH of the dispersed resin composition is 5 or higher, and more preferably 6 to 10.

The dispersed resin composition of the present invention contains (d) water or a hydrophilic substance as a fourth component. The hydrophilic substance means a substance exhibiting a hydrophilicity, and particularly a polar substance, in which the polyolefin resin or the modified polyolefin resin is not dissolved, is preferable. Specifically, alcohol-based, ketone-based and ester-based hydrophilic substances are exemplified. More preferably, methanol, ethanol, isopropyl alcohol and acetone are exemplified. These may be used alone or in combination of two or more kinds. The water may be any of tap water, distilled water and purified water. A water temperature may be appropriately set depending on a reaction condition. For example, when the polyolefin resin modified with chlorine is used, if the temperature is too high, the dehydrochlorination is potentially caused. If the temperature is too low, the resin is hard to be dissolved and the poor emulsification is potentially caused. Thus it is preferable to be considered.

The dispersed resin composition of the present invention contain is satisfied with including the components (a) to (d), and may contain additionally optional components such as surfactants.

An emulsifier in the present invention refers to a drug or an additive added for the purpose of stabilizing the dispersion when the polyolefin resin or the modified polyolefin resin is dispersed in water or hydrophilic substances, and can be restated as a surfactant. If necessary, the surfactant may be used in the present invention, and any of nonionic surfactants and anionic surfactants may be used. The nonionic surfactant is more preferable because the water resistance of the emulsified dispersed resin composition is better.

The nonionic surfactant may include polyoxyethylene alkyl ether, polyoxyethylene polyoxypropylene alkyl ether, polyoxyethylene derivatives, polyoxyethylene fatty acid ester, polyoxyethylene polyvalent alcohol fatty acid ester, polyoxyethylene polyoxypropylene polyol, sorbitan fatty acid ester, polyoxyethylene cured castor oil, polyoxyalkylene polycyclic phenyl ether, polyoxyethylene alkylamine, alkyl alkanolamide and polyalkylene glycol(meth)acrylate. Preferably, polyoxyethylene alkyl ether, polyoxyethylene fatty acid ester, polyoxyethylene sorbitan fatty acid ester and polyoxyethylene alkylamine are exemplified.

The anionic surfactant may include alkyl sulfate ester salts, polyoxyethylene alkyl ether sulfate salts, alkylbenzene sulfonate salts, α-olefin sulfonate salts, methyl taurate salts, sulfosuccinate salts, ether sulfonate salts, ether carboxylate salts, fatty acid salts, naphthalene sulfonic acid formalin condensates, alkylamine salts, quaternary ammonium salts, alkyl betaine and alkylamine oxide. Preferably, polyoxyethylene alkyl ether sulfate salts and sulfosuccinate salts are exemplified.

The weight ratio of the (a) polyolefin resin to the (b) (meth) acrylic acid homopolymer or copolymer is generally (a) 95 to 50:(b) 5 to 50 [in this regard, (a)+(b)=100, the same hereinafter), more preferably (a) 95 to 60:(b) 5 to 40, and still more preferably (a) 95 to 70:(b) 5 to 30 in the dispersed resin composition of the present invention. The more the amount of (a) to be blended is, the adhesive property to polypropylene (PP) substrates is enhanced. The more the amount of (b) to be blended is, the hardness of the coating film tends to become hard.

The amount of the surfactant (emulsifier) to be added in the dispersed resin composition of the present invention may be generally 30% by weight or less, preferably 20% by weight or less and more preferably 10% by weight or less based on the weight of the (a) polyolefin resin. When the amount exceeds 30% by weight, due to the excessive amount of the surfactant beyond the amount required for forming the aqueous resin composition, the adhesive property and the water resistance are remarkably reduced, and a plastic effect and a bleeding phenomenon are caused upon being formed into a dry film, and blocking occurs easily; thus, it is not preferable. A lower limit of the amount of the surfactant to be added is not particularly limited, it is better that the amount is as low as possible and the surfactant need not be added substantially.

When the amount of the (meth)acrylic acid homopolymer or copolymer to be added is large, the amount of the surfactant (emulsifier) to be added may be small. When the amount of the (meth)acrylic acid homopolymer or copolymer to be added is small, the amount of the emulsifier to be added is increased.

In the present invention, a crosslinking agent may be added in the dispersed resin composition depending on its use and purpose. The crosslinking agent means a compound that forms a crosslinking structure by reacting with a hydroxyl group, a carboxyl group or an amino group present in the polyolefin resin, the surfactant and the basic substance. The crosslinking agent that is per se soluble in water may be used, or the crosslinking agent dispersed in water by any method may also be used. Specific examples may include block isocyanate compounds, aliphatic or aromatic epoxy compounds, amine-based compounds and amino resins. A method for adding the crosslinking agent is not particularly limited. For example, the crosslinking agent may be added during the step for imparting the aqueous property or after imparting the aqueous property.

The dispersed resin composition of the present invention may blend aqueous acryl resins, aqueous urethane resins, lower alcohols, lower ketones, lower esters, preservatives, leveling agents, antioxidants, light stabilizers, ultraviolet ray absorbers, dyes, pigments, metal salts and acids depending on its use if necessary in addition to the above.

The pH value of the dispersed resin composition of the present invention is preferably 5 or higher and more preferably 6 to 10. When the pH value is lower than 5, the (a) polyolefin resin is not dispersed in the other components because neutralization is insufficient. Alternatively, even if the polyolefin resin is dispersed, the resin is easily precipitated and separated with time to potentially deteriorate the storage stability. Thus, it is not preferable. When the pH value is higher than 10, problems potentially occur in compatibility with the other components and safety in working environment.

The dispersed resin composition of the present invention can be produced by adding the components (a) to (d) and other components blended as needed in a reaction system and using a melting aid. For example, the (a) polyolefin resin or the modified polyolefin resin and the (b) (meth)acrylic acid homopolymer or copolymer are dissolved in the melting aid such as the solvent, subsequently the (c) basic substance is added to neutralize, then the (d) water or hydrophilic substance is added with stirring to disperse and then the solvent is removed by reduced pressure treatment. Alternatively, the dispersed resin composition can be produced through the step (1) of dissolving the (a) polyolefin resin or the modified polyolefin resin in the melting aid and the step (2) of adding and stirring the (b) (meth)acrylic acid homopolymer or copolymer, the (c) basic substance and the (d) water or hydrophilic substance. The solvent used as the melting aid here may be used without limitation as long as the component (a) and the component (b) are dissolved therein. Examples thereof may include organic solvents such as toluene and xylene.

According to the present invention, the dispersed resin composition can also be obtained by adding the components (a) to (d) together in a reaction system and stirring them at high temperature. For example, the dispersion in water or a hydrophilic substance containing no melting aid such as toluene can be obtained by controlling an internal pressure at 0.2 MPa or more after adding the components together and stirring them, keeping the mixture for one hour and then cooling the mixture. This method is preferable because the step of removing the melting aid by the reduced pressure treatment can be omitted and besides a small amount of the melting aid, which can not be removed completely by the reduced pressure treatment, is not left. The temperature upon stirring is not particularly limited, and may be determined appropriately in the range of 50 to 150° C.

The dispersion of the components in the method for producing the dispersed resin composition of the present invention may be performed according to any method such as a forced emulsification method, a phase inversion emulsification method, a D phase emulsification method and a gel emulsification method. Upon production, it is possible to employ a solo stirring using a stirring blade, a disper or a homogenizer, a multiple stirring combining them, or an equipment such as a sand mill or a multiaxial extruder.

An average particle diameter of the resin emulsified and dispersed in the water is preferably 300 nm or less, more preferably 200 nm or less and still more preferably 100 nm or less in the dispersed resin composition of the present invention. When the average particle diameter exceeds 300 nm, the storage stability of the aqueous resin composition and its compatibility with the other resin are potentially deteriorated, and then coating physical properties such as the adhesive property to a substrate, the solvent resistance, the water resistance and the blocking resistance are potentially reduced. It is possible to reduce the particle diameter infinitely. However, in such case, the amount of the surfactant to be added is generally increased. As the result, the coating physical properties such as adhesive properties to substrates, water resistance and solvent resistance are easily prone to be reduced. Thus, it is generally preferable to adjust to 50 nm or more. The average particle diameter in the present invention can be measured by a particle size distribution measurement using a light diffusion method, and the numerical values in Examples described later are obtained by this method. The particle diameter may be adjusted by appropriately selecting the amount and the kind of the surfactant to be used, and a stirring force upon emulsifying the resin in water.

To make the average particle diameter of the resin 300 nm or less in the dispersed resin composition of the present invention, it is preferable to employ the phase inversion emulsification method in which the phase is inverted by adding water to an organic solvent or the method using the multiple stirring, the sand mill or the multiaxial extruder which possesses a high shear force.

The dispersed resin composition of the present invention can function as an intermediate medium for substrates that have the low adhesive property causing difficulty to give coating such as paints. For example, the dispersed resin composition is useful as an adhesive agent between polyolefin-based substrates such as polypropylene or polyethylene substrates each other which have the poor adhesive property, and may be used regardless of the presence or absence of a surface treatment with plasma or corona on the substrate surface. That is, the polyolefin resin dispersion composition of the present invention can be used suitably as an adhesive agent, a primer, a binder for painting, a binder for inks, and a paint, adhesive agents for hair grafts and the like. The dispersed resin composition of the present invention can enhance hardness of the coating film; therefore, it is suitable for uses particularly requiring the hardness such as painting for hair grafts among the aforementioned uses.

EXAMPLES

Subsequently, the present invention will be described in more detail with reference to Examples and Comparative Examples, but the present invention is not limited thereto.

Production Example 1

Production of Ester Group-Containing Acrylic Acid Copolymer

In a continuously stirred tank reactor equipped with a blade stirrer, 47.1 g of styrene, 36.1 g of acrylic acid, 21.0 g of 1-eicosanol and 3 g of di-t-butyl peroxide as an initiator were added successively, and a copolymerization reaction and an esterification reaction were performed at reaction temperature of 214° C. and for a reactor retention time of about 15 minutes, and then an ester group-containing acrylic acid copolymer having a weight average molecular weight of 14,000 and an acid value of 235 (mg KOH/g) was yielded.

Production Example 2

Production of Ester Group-Containing Acrylic Acid Copolymer

In the continuously stirred tank reactor equipped with the blade stirrer, 47.1 g of styrene, 36.1 g of acrylic acid, 24.0 g of 1-octanol and 3 g of di-t-butyl peroxide as the initiator were added successively, and the copolymerization reaction and the esterification reaction were performed at reaction temperature of 214° C. and for the reactor retention time of about 15 minutes, and then an ester group-containing acrylic acid copolymer having the weight average molecular weight of 14,000 and the acid value of 170.7 (mg KOH/g) was yielded.

Production Example 3

Production of Ester Group-Containing Acrylic Acid Copolymer

In the continuously stirred tank reactor equipped with the blade stirrer, 47.1 g of styrene, 36.1 g of acrylic acid, 40.0 g of 1-octanol and 3 g of di-t-butyl peroxide as the initiator were added successively, and the copolymerization reaction and the esterification reaction were performed at reaction temperature of 214° C. and for the reactor retention time of about 15 minutes, and then an ester group-containing acrylic acid copolymer having the weight average molecular weight of 14,000 and the acid value of 92.1 (mg KOH/g) was yielded.

Example 1

The propylene-based random copolymer (propylene content: 96% by weight, ethylene content: 4% by weight, MFR=2.0 g/10 minutes, melting point (Tm): 125° C.), which was produced using a metallocene catalyst as a polymerization catalyst, was supplied to a biaxial extruder whose barrel temperature was set at 350° C. to perform heat degradation, thus yielding a propylene-based random copolymer having a melt viscosity of about 1500 mPa·s at 190° C. 100 Parts by weight of the degraded propylene-based random copolymer, 4 parts by weight of maleic anhydride and 3 parts by weight of dicumyl peroxide were previously mixed sufficiently, and subsequently supplied to the biaxial extruder (L/D=34, φ=40 mm, first barrel to eighth barrel), and then the reaction was performed under the condition of the retention time for 5 minutes, a rotation frequency at 300 rpm and barrel temperatures at 120° C. (first and second barrels), 180° C. (third and fourth barrels), 100° C. (fifth barrel) and 130° C. (sixth to eighth barrels). Then, unreacted maleic anhydride was removed by reduced pressure in the sixth to eighth barrels, yielding a maleic anhydride-modified propylene-based random copolymer. This resin (2 kg) was placed in a 50 L reaction tank to which a glass lining had been given, and chlorinated by adding 20 L of chloroform and blowing gaseous chlorine from a bottom of the reaction tank under the pressure at 0.2 MPa with irradiating with ultraviolet ray. The sample having a chlorine content of 15.4% by weight was obtained. Then, chloroform which was the solvent was distilled off using an evaporator to adjust a solid content to 30% by weight. 3.0% By weight of a stabilizer (t-butylphenylglycidyl ether) based on the resin weight was added to this chloroform solution, which was then supplied to the biaxial extruder (L/D=34, φ=40 mm, first barrel to seventh barrel). Solidification was performed under the condition of the retention time for 10 minutes, the rotation frequency at 50 rpm and the barrel temperatures at 90° C. (first to sixth barrels) and 70° C. (seventh barrel). A reduced pressure treatment was performed in the first, fourth to sixth barrels, yielding a maleic anhydride-modified chlorinated propylene-based random copolymer in which the weight average molecular weight was 70,000 and a graft weight of maleic anhydride was 2.7% by weight.

In a 2 L-volume four-necked flask equipped with a stirrer, a cooling tube, a thermometer and a dropping funnel, 140 g of the obtained maleic anhydride-modified chlorinated propylene-based random copolymer, 60 g of the ester group-containing acrylic acid copolymer obtained in Production Example 1, 8 g of the stabilizer (stearylglycidyl ether) and 36 g of toluene were added and kneaded at 120° C. for 30 minutes. Subsequently, 8 g of 2-amino-2-methyl-1-propanol was added over 5 minutes, then it was kept for 5 minutes.

After that, 970 g of hot water at 90° C. was added over 40 minutes. A reduced pressure treatment was performed to remove toluene. Then the reactant was cooled to room temperature with stirring, yielding an aqueous resin composition of the maleic anhydride-modified chlorinated propylene-based random copolymer.

Example 2

100 Parts by weight of the propylene-based random copolymer (propylene content: 88% by weight, ethylene content: 12% by weight, weight average molecular weight: 100,000, Tm=70° C.), which was produced using the metallocene catalyst as the polymerization catalyst, 4 parts by weight of maleic anhydride, 4 parts by weight of lauryl methacrylate and 3 parts by weight of dicumyl peroxide were reacted using the biaxial extruder set at 180° C. Deaeration was also performed in the extruder to remove remaining unreacted compounds, yielding a modified propylene-based random copolymer (weight average molecular weight: 70,000) in which the graft weight of maleic anhydride was 3.5% by weight and the graft weight of lauryl methacrylate was 3.2% by weight.

In a 2 L-volume four-necked flask equipped with a stirrer, a cooling tube, a thermometer and a dropping funnel, 140 g of the obtained modified propylene-based random copolymer, 60 g of the ester group-containing acrylic acid copolymer obtained in Production Example 1 and 36 g of toluene were added and kneaded at 120° C. for 30 minutes.

Subsequently, 12 g of dimethylethanolamine was added over 5 minutes, and then it was kept for 5 minutes. After that, 970 g of hot water at 90° C. was added over 40 minutes. The reduced pressure treatment was performed to remove toluene. Then the reactant was cooled to room temperature with stirring, yielding an aqueous resin composition of the modified propylene-based random copolymer.

Example 3

An aqueous resin composition of the maleic anhydride-modified chlorinated propylene-based random copolymer was obtained in the same way as in Example 1, except that 35 g of a nonionic surfactant (polyoxyethylene alkylamine) was added upon emulsification in the production of the aqueous resin composition of the maleic anhydride-modified chlorinated propylene-based random copolymer in Example 1.

Example 4

The aqueous resin composition of the modified propylene-based random copolymer was obtained in the same way as in Example 2, except that 35 g of the nonionic surfactant (polyoxyethylene alkylamine) was added upon emulsification in the production of the aqueous resin composition of the modified propylene-based random copolymer in Example 2.

Example 5

The aqueous resin composition of the maleic anhydride-modified chlorinated propylene-based random copolymer was obtained in the same way as in Example 1, except that the ester group-containing acrylic acid copolymer of Production Example 2 was used in place of the ester group-containing acrylic acid copolymer of Production Example 1 in Example 1.

Example 6

The aqueous resin composition of the modified propylene-based random copolymer was obtained in the same way as in Example 2, except that the ester group-containing acrylic acid copolymer of Production Example 2 was used in place of the ester group-containing acrylic acid copolymer of Production Example 1 in Example 2.

Example 7

The aqueous resin composition of the maleic anhydride-modified chlorinated propylene-based random copolymer was obtained in the same way as in Example 5, except that 35 g of the nonionic surfactant (polyoxyethylene alkylamine) was added upon emulsification in the production of the aqueous resin composition of the maleic anhydride-modified chlorinated propylene-based random copolymer in Example 5.

Example 8

The aqueous resin composition of the modified propylene-based random copolymer was obtained in the same way as in Example 6, except that 35 g of the nonionic surfactant (polyoxyethylene alkylamine) was added upon emulsification in the production of the aqueous resin composition of the modified propylene-based random copolymer in Example 6.

Example 9

The aqueous resin composition of the maleic anhydride-modified chlorinated propylene-based random copolymer was obtained in the same way as in Example 1, except that the ester group-containing acrylic acid copolymer of Production Example 3 was used in place of the ester group-containing acrylic acid copolymer of Production Example 1 in Example 1. The emulsified composition having the larger particle diameters than those in the other emulsified compositions was obtained.

Example 10

The aqueous resin composition of the modified propylene-based random copolymer was obtained in the same way as in Example 2, except that the ester group-containing acrylic acid copolymer of Production Example 3 was used in place of the ester group-containing acrylic acid copolymer of Production Example 1 in Example 2. The emulsified composition having the larger particle diameters than those in the other emulsified compositions was obtained.

Example 11

The maleic anhydride-modified chlorinated propylene-based random copolymer of which weight average molecular weight was 110,000 and graft weight of maleic anhydride was 2.7% by weight was obtained in the same way as in Example 1, except that the propylene-based random copolymer (propylene content: 96% by weight, ethylene content: 4% by weight, MFR=2.0 g/10 minutes, melting point (Tm): 125° C.), which was produced using the metallocene catalyst as the polymerization catalyst, was used in place of the propylene-based random copolymer produced using the metallocene catalyst as the polymerization catalyst in Example 1. Then, the aqueous resin composition of the maleic anhydride-modified chlorinated propylene-based random copolymer was obtained in the same way as in Example 1, except that the ester group-containing acrylic acid copolymer of Production Example 2 was used in place of the ester group-containing acrylic acid copolymer of Production Example 1 in Example 1.

Example 12

The modified propylene-based random copolymer of which weight average molecular weight was 110,000 and graft weight of maleic anhydride was 3.5% by weight and graft weight of lauryl methacrylate was 3.2% by weight was obtained in the same way as in Example 2, except that the propylene-based random copolymer (propylene content: 88% by weight, ethylene content: 12% by weight, weight average molecular weight: 160,000, melting point (Tm)=70° C.) produced using the metallocene catalyst as the polymerization catalyst was used in place of the propylene-based random copolymer produced using the metallocene catalyst as the polymerization catalyst in Example 2. Then, the aqueous resin composition of the modified propylene-based random copolymer was obtained in the same way as in Example 2, except that the ester group-containing acrylic acid copolymer of Production Example 2 was used in place of the ester group-containing acrylic acid copolymer of Production Example 1 in Example 2.

Example 13

The aqueous resin composition of a maleic anhydride-modified chlorinated propylene-based random copolymer was obtained in the same way as in Example 1, except using the maleic anhydride-modified chlorinated propylene-based random copolymer having the weight average molecular weight of 60,000 (chlorination degree: 20.0% by weight, graft weight of maleic anhydride: 2.7% by weight) obtained in the same way as in Example 1 except that the propylene-based random copolymer (propylene content: 97% by weight, ethylene content: 3% by weight, MFR=2.0 g/10 minutes, melting point (Tm): 150° C.), which was produced using Ziegler-Natta catalyst as the polymerization catalyst, was used in place of the propylene-based random copolymer produced using the metallocene catalyst as the polymerization catalyst in Example 1; and except that the ester group-containing acrylic acid copolymer of Production Example 2 was used in place of the ester group-containing acrylic acid copolymer of Production Example 1 in Example 1.

Example 14

The modified propylene-based random copolymer of which weight average molecular weight was 60,000, graft weight of maleic anhydride was 3.5% by weight and graft weight of lauryl methacrylate was 3.2% by weight was obtained in the same way as in Example 2, except that the propylene-based random copolymer (propylene content: 88% by weight, ethylene content: 12% by weight, weight average molecular weight: 80,000, melting point (Tm)=70° C.), which was produced using Ziegler-Natta catalyst as the polymerization catalyst, was used in place of the propylene-based random copolymer produced using the metallocene catalyst as the polymerization catalyst in Example 2. Then, the aqueous resin composition of the modified propylene-based random copolymer was obtained in the same way as in Example 2, except that the ester group-containing acrylic acid copolymer of Production Example 2 was used in place of the ester group-containing acrylic acid copolymer of Production Example 1 in Example 2.

Example 15

The aqueous resin composition of the maleic anhydride-modified chlorinated propylene-based random copolymer was obtained in the same way as in Example 1, except that 160 g of the maleic anhydride-modified chlorinated propylene-based random copolymer in Example 13, 40 g of the ester group-containing acrylic acid copolymer in Production Example 2 and 10 g of the nonionic surfactant (polyoxyethylene alkylamine) were added.

Example 16

The aqueous resin composition of the modified propylene-based random copolymer was obtained in the same way as in Example 2, except that 160 g of the modified propylene-based random copolymer in Example 14, 40 g of the ester group-containing acrylic acid copolymer in Production Example 2 and 10 g of the nonionic surfactant (polyoxyethylene alkylamine) were added.

Example 17

The aqueous resin composition of the maleic anhydride-modified chlorinated propylene-based random copolymer was obtained in the same way as in Example 1, except that 170 g of the maleic anhydride-modified chlorinated propylene-based random copolymer in Example 13, 30 g of the ester group-containing acrylic acid copolymer in Production Example 2 and 14 g of the nonionic surfactant (polyoxyethylene alkylamine) were added.

Example 18

The aqueous resin composition of the modified propylene-based random copolymer was obtained in the same way as in Example 2, except that 170 g of the modified propylene-based random copolymer in Example 14, 30 g of the ester group-containing acrylic acid copolymer in Production Example 2 and 14 g of the nonionic surfactant (polyoxyethylene alkylamine) were added.

Example 19

The aqueous resin composition of the maleic anhydride-modified chlorinated propylene-based random copolymer was obtained in the same way as in Example 1, except that 180 g of the maleic anhydride-modified chlorinated propylene-based random copolymer in Example 13, 20 g of the ester group-containing acrylic acid copolymer in Production Example 2 and 28 g of the nonionic surfactant (polyoxyethylene alkylamine) were added.

Example 20

The aqueous resin composition of the modified propylene-based random copolymer was obtained in the same way as in Example 2, except that 180 g of the modified propylene-based random copolymer in Example 14, 20 g of the ester group-containing acrylic acid copolymer in Production Example 2 and 28 g of the nonionic surfactant (polyoxyethylene alkylamine) were added.

Comparative Example 1

In a flask equipped with the stirrer, 30 g of a maleic anhydride-modified chlorinated propylene-based random copolymer (propylene-ethylene copolymer [propylene component: 94.5%], graft amount of maleic anhydride: 2.0% by weight, chlorine content: 21.1% by weight, weight average molecular weight: 51,000) and 70 g of tetrahydrofuran were placed, and the copolymer was dissolved by heating at 65° C. Then, 0.94 g (2 chemical equivalents) of dimethylethanolamine was added thereto. Water at 60° C. was added in small portions with keeping the temperature at 65° C. After adding 100 g of the water to inverse a phase from a W/O type to an O/W type dispersion, tetrahydrofuran was distilled off under reduced pressure at 93 KPa for 2.5 hours, yielding a milk-white dispersion.

Comparative Example 2

The aqueous resin composition of a maleic anhydride-modified chlorinated propylene-based random copolymer was obtained in the same way as in Example 1, except that the ester group-containing acrylic acid copolymer in Example 1 was changed to a styrene-acrylic acid copolymer having no ester group in the side chain (JONCRYL 611, supplied from BASF Japan). However, after the composition was stored for one day, its fluidity was reduced and a gel was formed.

Comparative Example 3

The aqueous resin composition of a modified propylene-based random copolymer was obtained in the same way as in Example 2, except that the ester group-containing acrylic acid copolymer in Example 2 was changed to a styrene-acrylic acid copolymer (JONCRYL 611, supplied from BASF Japan) having no ester group in the side chain. However, after the composition was stored for one day, its fluidity was reduced and a gel was formed.

Physical property values of the dispersed resin compositions in Examples are shown in Table 1.

TABLE 1

| | ESTER GROUP-CONTAINING ACRYLIC ACID COPOLYMER | | WEIGHT AVERAGE MOLECULAR WEIGHT OF | CHLORINE CONTAINED | GRAFT WEIGHT OF UNSATURATED CALBOXYLIC | GRAFT WEIGHT OF ACRYLIC ACID HAVING ESTERIFED |
|---|---|---|---|---|---|---|
| | Type | ACID VALUE | MODIFIED POLYOLEFINE | AMOUNT (WEIGHT %) | ACID (WEIGHT %) | CHAINS (WEIGHT %) |
| EXAMPLE 1 | PRODUCTION EXAMPLE 1 | 235 | 70,000 | 15.4 | 2.7 | 0 |
| EXAMPLE 2 | PRODUCTION EXAMPLE 1 | 235 | 70,000 | 0 | 3.5 | 3.2 |
| EXAMPLE 3 | PRODUCTION EXAMPLE 1 | 235 | 70,000 | 15.4 | 2.7 | 0 |
| EXAMPLE 4 | PRODUCTION EXAMPLE 1 | 235 | 70,000 | 0 | 3.5 | 3.2 |
| EXAMPLE 5 | PRODUCTION EXAMPLE 2 | 170 | 70,000 | 15.4 | 2.7 | 0 |
| EXAMPLE 6 | PRODUCTION EXAMPLE 2 | 170 | 70,000 | 0 | 3.5 | 3.2 |
| EXAMPLE 7 | PRODUCTION EXAMPLE 2 | 170 | 70,000 | 15.4 | 2.7 | 0 |
| EXAMPLE 8 | PRODUCTION EXAMPLE 2 | 170 | 70,000 | 0 | 3.5 | 3.2 |
| EXAMPLE 9 | PRODUCTION EXAMPLE 3 | 91 | 70,000 | 15.4 | 2.7 | 0 |
| EXAMPLE 10 | PRODUCTION EXAMPLE 3 | 91 | 70,000 | 0 | 3.5 | 3.2 |
| EXAMPLE 11 | PRODUCTION EXAMPLE 2 | 170 | 110,000 | 15.4 | 2.7 | 0 |
| EXAMPLE 12 | PRODUCTION EXAMPLE 2 | 170 | 110,000 | 0 | 3.5 | 3.2 |
| EXAMPLE 13 | PRODUCTION EXAMPLE 2 | 170 | 60,000 | 20.0 | 2.7 | 0 |
| EXAMPLE 14 | PRODUCTION EXAMPLE 2 | 170 | 60,000 | 0 | 3.5 | 3.2 |
| EXAMPLE 15 | PRODUCTION EXAMPLE 2 | 170 | 60,000 | 20.0 | 2.7 | 0 |
| EXAMPLE 16 | PRODUCTION EXAMPLE 2 | 170 | 60,000 | 0 | 3.5 | 3.2 |
| EXAMPLE 17 | PRODUCTION EXAMPLE 2 | 170 | 60,000 | 20.0 | 2.7 | 0 |
| EXAMPLE 18 | PRODUCTION EXAMPLE 2 | 170 | 60,000 | 0 | 3.5 | 3.2 |
| EXAMPLE 19 | PRODUCTION EXAMPLE 2 | 170 | 60,000 | 20.0 | 2.7 | 0 |
| EXAMPLE 20 | PRODUCTION EXAMPLE 2 | 170 | 60,000 | 0 | 3.5 | 3.2 |
| COMPARATIVE EXAMPLE 1 | NONE | — | 51,000 | 21.1 | 2.0 | 0 |
| COMPARATIVE EXAMPLE 2 | STYRENE-ACRYLIC ACID COPOLYMER | — | 70,000 | 15.4 | 2.7 | 0 |
| COMPARATIVE EXAMPLE 3 | STYRENE-ACRYLIC ACID COPOLYMER | — | 70,000 | 0 | 3.5 | 3.2 |

(Evaluation Methods)

According to the following methods, the storage stability, the adhesive property, the gasohol resistance, the water resistance and the coating film hardness were evaluated for the aqueous dispersed resin compositions obtained in Examples 1 to 20 and Comparative Example 1.

The adhesive property, the gasohol resistance and the water resistance were evaluated using test pieces made by the following method. That is, the aqueous dispersed resin composition whose solid content was 30% by weight was painted on a polypropylene substrate, dried at 80° C. for 5 minutes, and subsequently a two-component urethane paint was painted. Subsequently, samples in Examples 1 to 12 were dried at 80° C. for 30 minutes and samples in Examples 13 to 20 were dried at 120° C. for 30 minutes, preparing the test pieces.

For evaluating the coating film hardness, a sample was painted on one side of the test piece, dried, left stand for one hour or more and subsequently used.

Storage Stability

A cycle in which the aqueous dispersed resin composition was frozen at −20° C. over 15 hours and then melted at 25° C. over 6 hours was repeated five times to evaluate the stability of the aqueous dispersion resin. In evaluation criteria, the case where almost no change was observed in the particle diameter and the viscosity compared with those before the test was ranked as A; the case where the change was observed in the particle diameters and the viscosity but the fluidity was shown was ranked as B; the case where the fluidity was shown but the particle diameters and the viscosity were remarkably increased was ranked as C; and the case where no fluidity was shown with a state like the gel or a pudding was ranked as D. The viscosity is defined as a value (unit: mPa·s) obtained by measuring the viscosity of the aqueous resin composition at 25° C. using a B type rotating viscometer.

Adhesive Property

On the surface of the paint film, 100 grids with an interval of 1 mm, which reached the substrate surface were made, a cellophane adhesive tape was adhered thereon and peeled toward a 180° direction 10 times. The case where no coating film was peeled when the tape was peeled 10 times was ranked as A; the case where 50 or more grids of the coating film were not peeled was ranked as B; the case where 50 or more and less than 100 grids of the film were peeled was ranked as C; and the case where all grids of the film were peeled was ranked as D.

Gasohol Resistance

A painted plate was immersed in regular gasoline/ethanol=9/1 (v/v) for 120 minutes, and the state of coating film was observed. The case where no change was observed on the coating film surface was ranked as A; the case where no peal occurred on the coating film surface but a blister was observed was ranked as B; the case where a peel occurred on the coating film surface was ranked as C; and the case where the coating film surface was peeled completely was ranked as D.

Moisture Resistance

The painted plate was immersed in warm water at 40° C. for 240 hours, and then the state and the adhesive property of the coating film were examined. The case where no change was observed on the coating film surface and the adhesive property was good was ranked as A; the case where no peel occurred on the coating film surface but a blister was observed was ranked as B; the case where the peel occurred on the coating film surface was ranked as C; and the case where the coating film surface was peeled completely was ranked as D.

Coating Film Hardness

A pencil hardness test by hand drawing on the painted plate was performed in accordance with JIS K5400. In the evaluation of the coating film hardness, 9H of a pencil hardness scale is the hardest while 6B is the softest.

Evaluation results are shown in Table 2.

TABLE 2

PHYSICAL PROPERTIES EVALUATION RESULTS

| | STORAGE STABILITY | ADHESIVE PROPERTY | GASOHOL RESISTANCE | MOISTURE RESISTANCE | COATING FILM HARDNESS |
|---|---|---|---|---|---|
| EXAMPLE 1 | A | A | A | B | H |
| EXAMPLE 2 | A | A | A | B | H |
| EXAMPLE 3 | A | A | B | B | 5B |
| EXAMPLE 4 | A | A | B | B | 5B |
| EXAMPLE 5 | A | A | A | A | H |
| EXAMPLE 6 | A | A | A | A | H |
| EXAMPLE 7 | A | A | B | B | 5B |
| EXAMPLE 8 | A | A | B | B | 5B |
| EXAMPLE 9 | B | B | B | A | H |
| EXAMPLE 10 | B | B | B | A | H |
| EXAMPLE 11 | A | A | A | A | H |
| EXAMPLE 12 | A | A | A | A | H |
| EXAMPLE 13 | A | A | A | A | H |
| EXAMPLE 14 | A | A | A | A | H |
| EXAMPLE 15 | A | A | A | A | 2H |
| EXAMPLE 16 | A | A | A | A | 2H |
| EXAMPLE 17 | A | A | A | A | 3H |
| EXAMPLE 18 | A | A | A | A | 3H |
| EXAMPLE 19 | A | A | A | B | 5B |
| EXAMPLE 20 | A | A | A | B | 5B |
| COMPARATIVE EXAMPLE 1 | D | C | D | A | B |

From the results of Examples in Table 2, it has been found that the aqueous resin compositions of Examples have the good adhesive property to the polyolefin substrate and the good gasohol resistance in addition to the good storage stability (dispersibility) compared with the composition in Comparative Example 1 having no ester group-containing acrylic acid copolymer. In the case of the compositions in Examples 3, 4, 7, 8, 15 to 20 in which the surfactant (emulsifier) had been added, the coating film became somewhat soft because the emulsifier bled onto the coating film surface. Thus, in the compositions in Examples other than the above, in which the emulsifier had not been added, the better evaluations tended to be obtained concerning the gasohol resistance and the water resistance of the coating film and the coating film hardness.

In the compositions in Examples 9 and 10 using the ester group-containing acrylic acid copolymer (Production Example 3) having the low acid value, the water resistance was remarkably improved, but the storage stability and the adhesive property tended to be slightly reduced. It is assumed that the low acid-value was attributed to the slightly reduced emulsifying property. Meanwhile, in the compositions of Examples 1 and 2 using the ester group-containing acrylic acid copolymer (Production Example 1) having the high acid value, the storage stability and the adhesive property were enhanced because the emulsifying property was improved, but the water resistance was slightly reduced.

In contrast, in Examples 5 and 6 using the ester group-containing acrylic acid copolymer (Production Example 2) having the acid value of 170, good evaluations were given to all parameters examined. In the compositions in Examples 11 and 12 obtained in the same way as in Examples 5 and 6, respectively, except that the weight average molecular weight of the propylene-based random copolymer that was the component (a) was increased, the good evaluations were given like Examples 5 and 6 with regard to all of the parameters examined. In addition, the good evaluations were given to all of the parameters examined in the compositions in Examples 13 and 14 using the Ziegler-Natta-based random copolymer as the component (a).

The tests were performed concerning the compositions obtained by changing the weight ratio of the propylene-based random copolymer, the ester group-containing acrylic acid copolymer and the nonionic surfactant through Examples 15 to 20. In Examples 19 and 20, the water resistance was slightly reduced, which was speculated to result from the increased amount of the nonionic surfactant, but the good evaluations were given to the other parameters.

The storage stability, the adhesive property and the gasohol resistance were poor in Comparative Example 1. It is conceivable that Comparative Example 1 had "B" hardness because the ester group-containing acrylic acid copolymer that was the component (b) was not used.

The invention claimed is:

1. A dispersed resin composition comprising:
   (a) a polyolefin resin;
   (b) a (meth)acrylic acid homopolymer or copolymer having a side chain comprising an esterified alkyl group;
   (c) a basic substance; and
   (d) water or a hydrophilic substance,
   wherein the (a) polyolefin resin is a modified polyolefin resin comprising 60 mol % or more of a propylene component, and is modified by one or more polarity-imparting agents comprising a (meth)acryl compound comprising at least one (meth)acrylate ester represented by formula (I) in an amount of 20% by weight or more:

$$CH_2=CR_1COOR_2 \quad (I),$$

where $R_1$ is H or $CH_3$, $R_2$ is $C_nH_{2n+1}$, and n is an integer of 1 to 18; and
   the (b) (meth)acrylic acid homopolymer or copolymer comprises an ester group and is obtained by bulk polymerizing (i) (meth)acrylic acid, or (i) (meth)acrylic acid and (ii) a monomer having an unsaturated bond copolymerizable with said (meth)acrylic acid, simultaneously with esterifying in alcohol having 3 or more carbon atoms and a straight or branched structure.

2. The dispersed resin composition according to claim 1, wherein an acid value of said (b) (meth)acrylic acid homopolymer or copolymer is within a range of 1 to 300 mg KOH/g.

3. The dispersion resin composition according claim 1, wherein an acid value of said (b) (meth)acrylic acid homopolymer or copolymer is within a range of 100 to 200 mg KOH/g.

4. The dispersed resin composition according to claim 1, wherein said (b) (meth)acrylic acid homopolymer or copolymer is a homopolymer comprising an ester group and obtained by bulk polymerizing (i) (meth)acrylic acid simultaneously with esterifying in alcohol having 3 or more carbon atoms and a straight or branched structure.

5. The dispersed resin composition according to claim 1, wherein said (b) (meth)acrylic acid homopolymer or copolymer is a copolymer comprising an ester group and obtained by bulk polymerizing (i) (meth)acrylic acid and (ii) a monomer having an unsaturated bond copolymerizable with said (meth)acrylic acid, simultaneously with esterifying in alcohol having 3 or more carbon atoms and a straight or branched structure.

6. The dispersion resin composition according to claim 1, wherein the (a) polyolefin resin is a modified polyolefin resin comprising 80 mol % or more of a propylene component.

7. The dispersion resin composition according to claim 1, wherein a weight ratio of the (a) polyolefin resin to the (b) (meth)acrylic acid homopolymer or copolymer is 95 to 50:5 to 50.

8. The dispersion resin composition according to claim 1, wherein a weight ratio of the (a) polyolefin resin to the (b) (meth)acrylic acid homopolymer or copolymer is 95 to 70:5 to 30.

9. The dispersed resin composition according to claim 1, wherein the polarity-imparting agents further comprise one or more selected from the group consisting of chlorine, unsaturated carboxylic acids, and derivatives and anhydrides of unsaturated carboxylic acids.

10. The dispersion resin composition according to claim 1, wherein the polarity-imparting agents further comprise chlorine, and a total content of the polarity-imparting agents is 1 to 30% by weight.

11. The dispersion resin composition according to claim 10, wherein the total content of the polarity-imparting agents is 3 to 25% by weight.

12. The dispersion resin composition according to claim 1, wherein the polarity-imparting agents further comprise one or more selected from the group consisting of an unsaturated carboxylic acid, a derivative of an unsaturated carboxylic acid, and an anhydride of an unsaturated carboxylic acid, and a total graft weight of the polarity-imparting agents is 0.1 to 10% by weight.

13. A process for producing a dispersed resin composition, comprising:
   dissolving (a) a polyolefin resin and (b) a (meth)acrylic acid homopolymer or copolymer having a side chain containing an esterified alkyl group in a solvent;
   subsequently adding (c) a basic substance to neutralize;
   subsequently adding (d) water or a hydrophilic substance to disperse; and then
   removing the solvent,
   wherein the (a) polyolefin resin is a modified polyolefin resin comprising 60 mol % or more of a propylene component, and is modified by one or more polarity-imparting agents comprising a (meth)acryl compound comprising at least one (meth)acrylate ester represented by formula (I) in an amount of 20% by weight or more:

$$CH_2=CR_1COOR_2 \quad (I),$$

where $R_1$ is H or $CH_3$, $R_2$ is $C_nH_{2n+1}$, and n is an integer of 1 to 18; and the (b) (meth)acrylic acid homopolymer or copolymer comprises an ester group and is obtained by bulk polymerizing (i) (meth)acrylic acid, or (i) (meth)acrylic acid and (ii) a monomer having an unsaturated bond copolymerizable with said (meth)acrylic acid, simultaneously with esterifying in alcohol having 3 or more carbon atoms and a straight or branched structure.

14. A process for producing a dispersed resin composition, comprising:

adding (a) a polyolefin resin, (b) a (meth)acrylic acid homopolymer or copolymer having a side chain comprising an esterified alkyl group, (c) a basic substance and (d) water or a hydrophilic substance together in a reaction system to obtain a mixture; and stirring the mixture, wherein the (a) polyolefin resin is a modified polyolefin resin comprising 60 mol % or more of a propylene component, and is modified by one or more polarity-imparting agents comprising a (meth)acryl compound comprising at least one (meth)acrylate ester represented by formula (I) in an amount of 20% by weight or more:

$$CH_2=CR_1COOR_2 \qquad (I),$$

where $R_1$ is H or $CH_3$, $R_2$ is $C_nH_{2n+1}$, and n is an integer of 1 to 18; and the (b) (meth)acrylic acid homopolymer or copolymer comprises an ester group and is obtained by bulk polymerizing (i) (meth)acrylic acid, or (i) (meth)acrylic acid and (ii) a monomer having an unsaturated bond copolymerizable with said (meth)acrylic acid, simultaneously with esterifying in alcohol having 3 or more carbon atoms and a straight or branched structure.

* * * * *